Feb. 2, 1937.  R. A. ROTT  2,069,481
REFRIGERATED TRUCK
Filed March 25, 1935  2 Sheets-Sheet 1
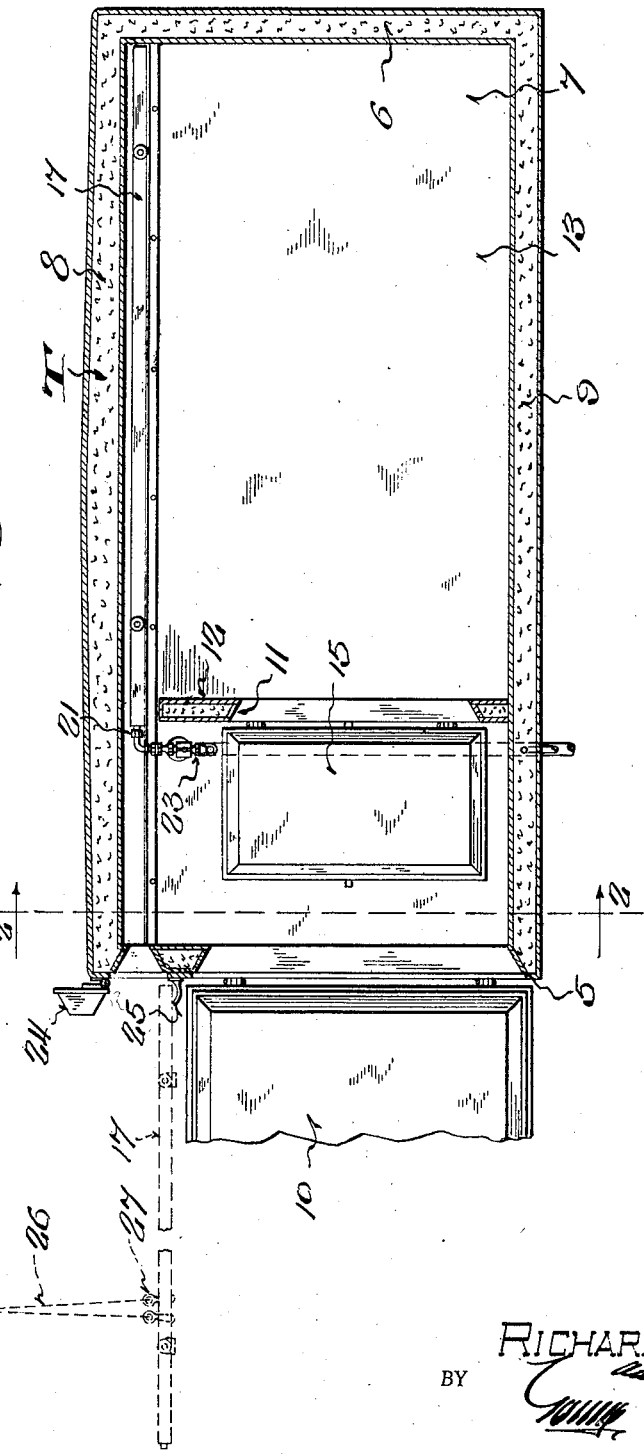
INVENTOR.
RICHARD A. ROTT
BY
ATTORNEY.

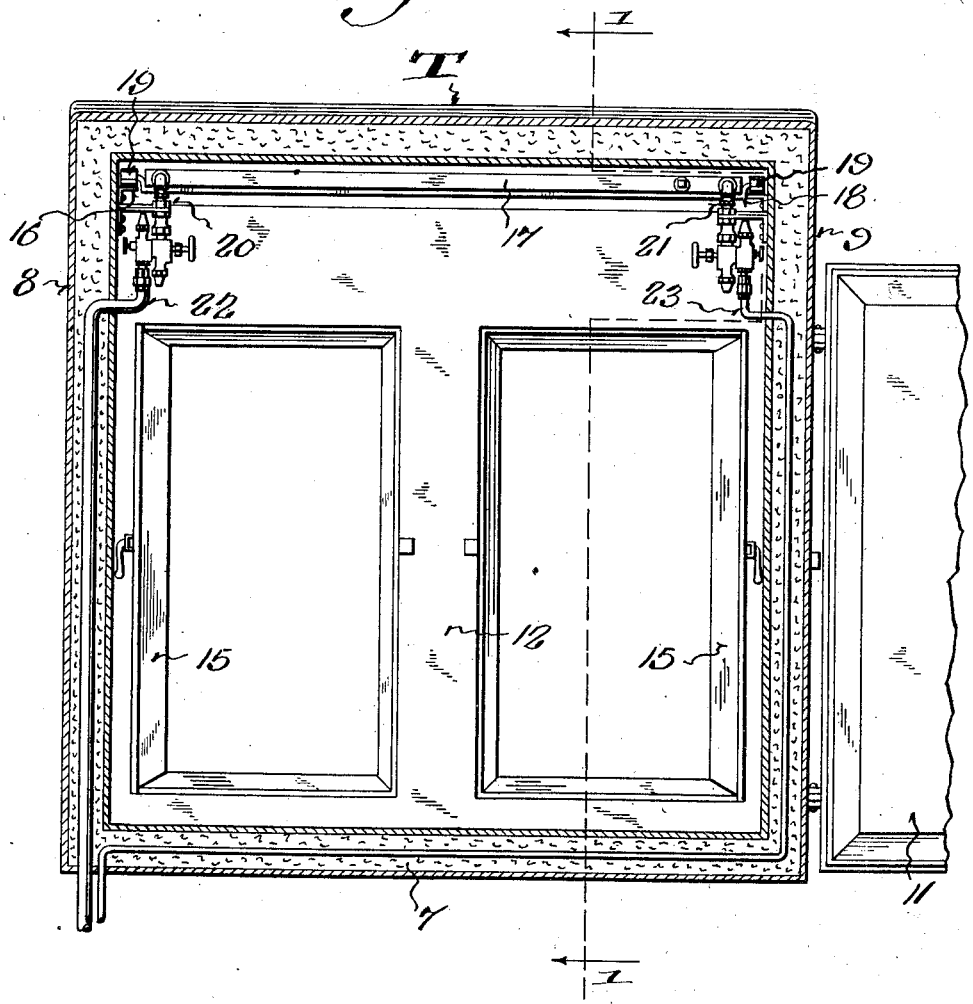

Patented Feb. 2, 1937

2,069,481

UNITED STATES PATENT OFFICE 2,069,481

REFRIGERATED TRUCK

Richard A. Rott, Madison, Wis.

Application March 25, 1935, Serial No. 12,827

3 Claims. (Cl. 62—89)

This invention appertains to refrigerating trucks for delivering perishable products, such as ice cream.

In refrigerating trucks of the type commonly referred to as the "Holdover" or "Kold-Hold", refrigerating units are permanently installed at the desired point or points within the truck body. The temperature of these units is lowered to the desired degree at the beginning of the day's run, either by a compressor mounted on the truck or by a compressor located in the plant. The units are of such a character as not to again require the lowering of their temperature until the truck is laid up for the night.

These trucks have many recognized points of superiority over other means of refrigeration. However, one of the main difficulties is the fact that the efficiency of the units is soon reduced by ice collecting (frost) on the units. To defrost the units, it is necessary to raise the temperature of the entire truck body.

This is a messy operation, and not only does this result in the wasting of refrigeration and the placing of the truck temporarily out of commission, but where goods are left over, the same has to be removed from the truck to a refrigerator. This results in additional loading and unloading expense, accounting expense, etc.

Also, in this defrosting method, water collects in the truck, which soon water-soaks the truck insulation, resulting in the rapid deterioration thereof.

It is, therefore, one of the salient objects of my invention to provide a novel means and method for rapidly defrosting the units, without materially lowering the temperature of the truck body or the units, and without any danger of ruining the truck insulation.

Another important object of my invention is the provision of means for slidably mounting the cooling units within the truck body, whereby the same can be temporarily swung out of the body to permit the frost to be removed by hot water supplied from a hose.

A further object of my invention is the provision of an entrance and exit door in the truck for the cooling unit, whereby the truck body can be completely closed during the washing of the cooling units.

A further object of my invention is the provision of means for supporting one end of the cooling unit by the truck body when the unit is moved exteriorly of the body for defrosting purposes, so that the unit will be conveniently supported and ready for instant insertion within the truck body upon completion of the defrosting process.

A further object of my invention is the provision of a refrigerating body having a main compartment and a supplemental compartment, the supplemental compartment permitting the initial removal of products from the truck without interfering with the products in the main compartment, the supplemental compartment serving as means for receiving empty containers after the unloading thereof, the mounting of the refrigerating unit being such as to permit the same to be slid wholly within the main compartment after the unloading of the supplemental compartment to prevent waste of refrigeration.

With these and other objects in view, the invention consists in the novel construction, arrangement, and formation of parts, as will be hereinafter more specifically described, claimed, and illustrated in the accompanying drawings, in which:—

Figure 1 is a vertical longitudinal section through a refrigerating truck body constructed in accordance with my invention, the view being taken substantially on the line 1—1 of Figure 2, the refrigerating unit being shown in full lines within the truck body and wholly disposed within the main compartment, and in dotted lines exteriorly of the body for defrosting.

Figure 2 is a transverse section through the refrigerating truck, taken substantially on the line 2—2 of Figure 1 looking in the direction of the arrows.

Referring to the drawings in detail, wherein similar reference characters designate corresponding parts throughout the several views, the letter T generally indicates a refrigerating truck body. The truck body T may, in general, be constructed along the lines of the truck body shown in Patent No. 1,907,217, issued to me May 2, 1933, with the addition of my present improvements.

As shown, the truck body T includes end walls 5 and 6, side walls 7, and top and bottom walls 8 and 9. All of these walls are thoroughly insulated in any preferred way. The end wall 5 and a side wall 7 can be provided respectively with entrance doors 10 and 11.

If the truck body T is constructed along the lines of my patented structure, the same is provided with a transverse partition 12, which divides the truck into a main compartment 13 and a supplemental compartment 14. Communication can be had between the compartments 13 and 14 by doors 15. The side door 11 communicates with the main compartment 13. It is also to be noted, in the present instance, that the transverse partition 12 terminates slightly short of the top wall, or roof, 8 of the truck.

In accordance with my invention, the inner faces of the side walls 7, adjacent to the upper ends thereof, are provided with longitudinally extending guide tracks 16. These tracks 16 are preferably formed from angle iron and can extend from one end of the body to the other.

Mounted on the tracks for sliding movement is the cooling unit 17, and the sides of the unit can support brackets 18, on which are mounted anti-friction rollers 19 for engaging the track. Thus, the track 16 and the cooling unit 17 are mounted above the transverse partition 12, and the cooling unit can be moved thereover.

The cooling unit has connection, by means of suitable detachable couplings 20 and 21, with the suction and liquid lines 22 and 23. These lines may lead to a condensing unit, or compressor, mounted on the truck, or to a condensing unit permanently installed in the plant.

Where the compressor is mounted on the truck, it is merely necessary to connect the electric motor thereof with the house current when the truck is not in use, and where the condensing unit is permanently installed in the plant or garage, flexible couplings can be connected with the pipes 22 and 23.

The rear wall 5 of the truck is provided above the main rear door 10 with a relatively narrow swinging door 24. This door extends transversely of the truck body, and thus the door opening is in longitudinal alinement with the track 16. Thus, the cooling unit 17 can be readily slid into and out of the truck body. When the cooling unit is swung out of the truck body, the door 24 is closed so as to prevent the undue raising of the temperature inside the truck.

Below the auxiliary door 24, the rear wall 5 is provided with supporting hooks 25, on which the rear end of the cooling unit is adapted to rest when the cooling unit is moved exteriorly of the truck. The front end of the cooling unit can be supported by suitable grapple 26, which may include hooks 27 for engaging the sides of the unit.

In use of my improved truck, when it is desired to defrost the unit 17, the unit is disconnected from the pipes 22 and 23 by suitable manipulation of the couplings 20 and 21, and the entrance and exit openings of the unit are closed by suitable plugs or the like, or shut-off valves can be provided at this point. Obviously, the refrigerating medium will be in a solidified condition.

The door 24 is now swung to its open position, and the unit is slid on the track 16 exteriorly of the truck body, the same being grasped by the hooks 27. When the unit is swung all the way out of the body, the door 24 is closed and the inner end of the unit is rested on the hooks 25.

Hot water can now be sprayed over the unit, which will quickly defrost the same without materially lowering the interior temperature of the unit, and when the defrosting process has been completed, the unit is again slid into the truck and coupled with the pipes 22 and 23.

By this arrangement, the wasting of refrigeration is entirely eliminated, the truck is not placed out of commission, and any products in the truck can be left therein.

I am also enabled to conserve refrigeration by the installation described above, in that the single unit 17 can be used for cooling both the compartments 13 and 14, or the main compartment only.

When the truck is loaded and starts on its delivery trip the unit 17 is slid rearwardly on the track 16, so as to lie in both compartments 13 and 14 (the unit being disconnected from the pipes 22 and 23). During the initial delivery, the goods are removed from the compartment 14, and when this compartment is completely unloaded, the unit 17 can be slid wholly within the compartment 13. The door 15 can thereafter be left closed.

As the compartment is now empty, there is no longer any need for cooling the same, and this compartment can be used for the storage of empty containers.

Changes in details may be made without departing from the spirit or the scope of this invention, but what I claim as new is:—

1. In a refrigerated delivery truck, an insulated truck body having one wall provided with a narrow elongated opening, a door for closing said opening, tracks supported in the truck body in alinement with the door opening, a cooling unit slidably mounted on the tracks and movable through the door opening, feed and return pipes detachably connected to said unit, and means on the exterior of the body adjacent to the door opening for supporting one end of the unit when the same is disposed exteriorly of the body.

2. In a refrigerated delivery truck, an insulated truck body, a transverse partition arranged in said truck body defining a main insulated compartment and an auxiliary insulated compartment, the transverse partition terminating slightly short of the top wall of the body, supporting tracks carried by the body extending into both compartments over the transverse partition, and a cooling unit slidably mounted on the tracks, whereby said unit can be moved wholly within the main compartment or over the partition into both compartments.

3. In a refrigerated delivery truck, an insulated truck body having one wall provided with a narrow elongated opening, a door for sealing said opening, tracks supported in the truck body in alinement with the door opening, a cooling unit slidably mounted on the tracks and movable through the door opening, and feed and return pipes detachably connected to said sliding unit.

RICHARD A. ROTT.